J. F. HINCK.
HOSE COUPLING.
APPLICATION FILED FEB. 14, 1908.

935,984.

Patented Oct. 5, 1909.

WITNESSES

INVENTOR
JESS F. HINCK.

UNITED STATES PATENT OFFICE.

JESS F. HINCK, OF MINNEAPOLIS, MINNESOTA.

HOSE-COUPLING.

935,984.　　　　Specification of Letters Patent.　　Patented Oct. 5, 1909.

Application filed February 14, 1908. Serial No. 415,908.

*To all whom it may concern:*

Be it known that I, JESS F. HINCK, a citizen of the United States, residing at Minneapolis, in the county of Hennepin and State of Minnesota, have invented certain new and useful Improvements in Hose-Couplers, of which the following is a specification, reference being had to the accompanying drawings.

My invention relates to improvements in hose couplers, and consists of the novel features of construction and the combination and arrangement of parts hereinafter described and claimed.

The object of the invention is to provide a coupling device of this character by means of which two sections of a hose pipe or the like may be quickly and easily connected and disconnected, and to provide one which is simple and inexpensive in construction, and strong and durable in use.

The above and other objects of the invention are attained in its preferred embodiment illustrated in the accompanying drawings, in which—

Figure 1:
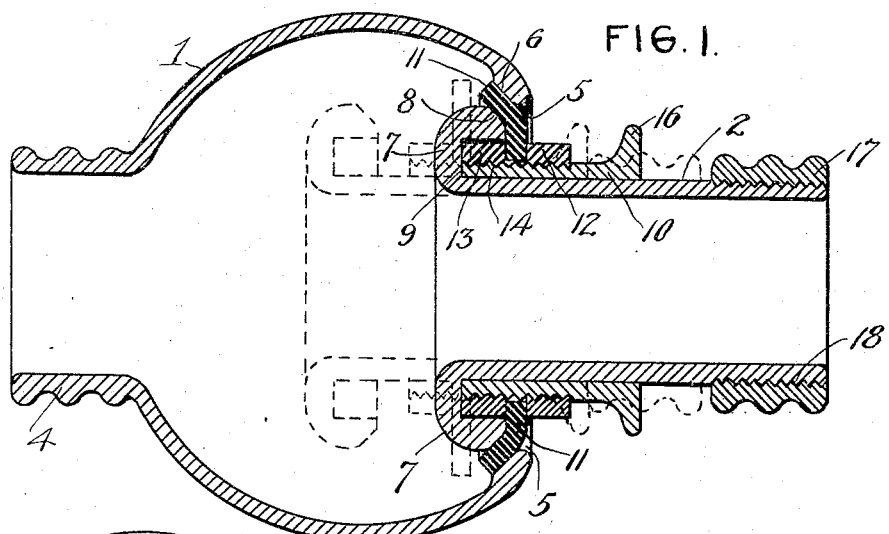
Figures 3, 4:
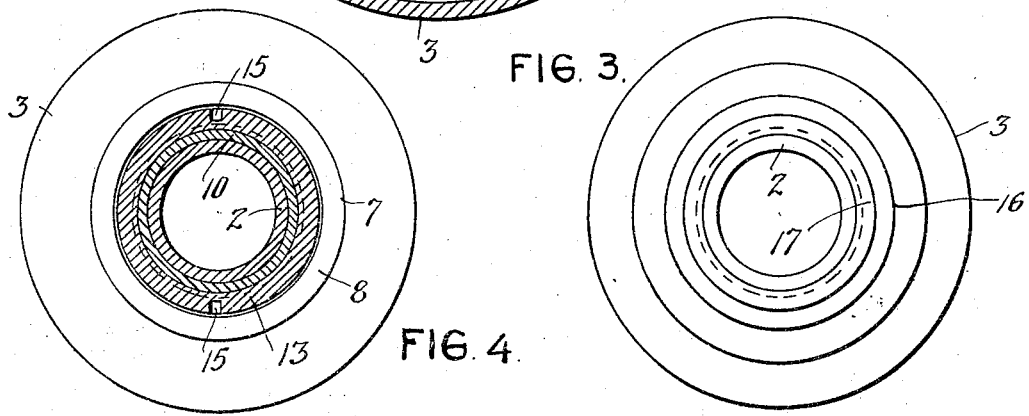
Figure 2:
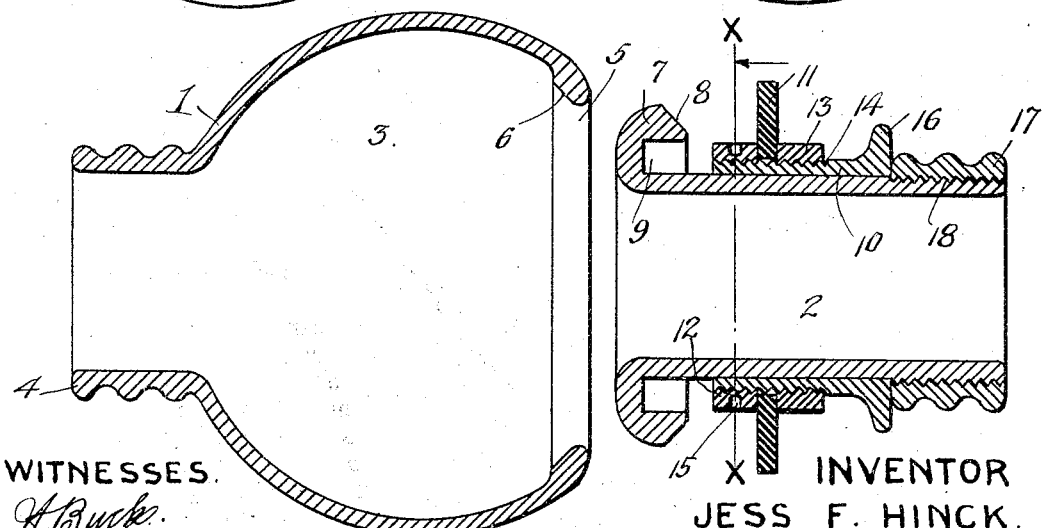

Figure 1 is a longitudinal section through the hose coupler showing the parts in their engaged or operative position in full lines; Fig. 2 is a similar view showing the two members of the coupling disconnected; Fig. 3 is a view of the right hand end of the device shown in Fig. 1; and Fig. 4 is a transverse section taken on the plane indicated by the line X—X in Fig. 2, looking in the direction of the arrow.

The hose coupler comprises two coupling members 1, 2, the latter of which is adapted to enter the former. The member 1 has a large bulb-like body 3 at one end of which is a reduced tubular portion 4 having a corrugated outer surface for the attachment of a section of hose. The other end of the bulbular or ball-like body 3 is formed with a large mouth or opening 5 having an inwardly beveled annular face 6. The other or inner coupling member 2 has a cylindrical body at one end of which is a radially projecting annular flange 7 which forms a circular head. This flange or head is of slightly less diameter than the mouth 5 of the outer coupling so that it may be slipped into the latter and the inner edge of said flange or head 7 is shaped to provide an annular beveled face 8 which has substantially the same angle as the beveled face 6 in the mouth 5. The flange or head 7 is undercut or grooved as at 9 to receive one end of a sleeve 10 which is adapted to slide longitudinally upon the member 2 and which carries a washer ring 11 of soft rubber or the like. Said washer is preferably attached to its carrying sleeve 10 by securing it between two clamping nuts 12, 13 which are screwed upon the threaded end 14 of the sleeve 10 and which have annular outer faces formed with diametrically opposed notches or seats 15 for the reception of a wrench or the like. The washer is arranged adjacent to one end of the sleeve 10. At the other end of the sleeve is formed an annular flange 16 by means of which the sleeve may be readily moved longitudinally on the member 2. It is retained upon the latter by a stop sleeve or collar 17 which is screwed upon the threaded outer end 18 of the member 2 and has its face corrugated for the attachment of a section of hose.

The operation of the invention will be readily seen upon reference to Fig. 1. When it is desired to connect the two members of the coupling, the sleeve 10 on the inner member 2 is moved outwardly toward the stop 17 as indicated in dotted lines in Fig. 1, and the flange or head 7, on said member 2, is inserted in the enlarged body 3 of the body 1 through its mouth or opening 5. The sleeve 10 is then moved inwardly or toward the flange 7 so that the washer 11 passes through the mouth or opening 5 in the member 1. The member 2 is then drawn outwardly so that the soft rubber washer 11 will be compressed between the opposing faces 6, 8 on the two coupling members, as shown in full lines in Fig. 1. When the parts are in this position, the two hose sections will be effectively coupled and they may be quickly disengaged by reversing the operation above described. The wedging of the flange or head 8 into the mouth or opening 5 produces a joint that will be water tight and inseparable until the member 2 is moved into the member 1 to disconnect the parts.

Having thus described my invention what I claim is:

1. A hose coupler comprising an outer coupling member having an opening, an inner coupling member to enter the opening in the outer one and a locking member freely slidable upon the inner member and adapted to be wedged by the latter between it and the outer member when the two coupling members are under tension, said locking member being adapted to be moved into or out of the outer member when there is no tension upon the inner member and the latter projects into the outer one, substantially as set forth.

2. A hose coupler comprising readily detachable outer and inner members, a member freely slidable upon the inner member and a washer carried by said slidable member and adapted to enter between the two members to prevent the removal of the inner one from the outer one when they are under tension.

3. A hose coupler comprising an outer member having an opening formed with a beveled face, an inner member adapted to enter the outer one and formed with a beveled face to oppose the beveled face upon the outer member, a sleeve slidable upon the inner member and a washer ring arranged upon the sleeve and adapted to be engaged by the beveled faces of the two members when the latter are coupled.

4. A hose coupler comprising an outer member having an enlarged bulb-like body formed with an opening having an inwardly beveled face, an inner member having a cylindrical body formed at one end with a head having a beveled face to oppose the beveled face of the other member, a sleeve slidable upon the inner member, clamping nuts upon said sleeve and a washer ring held on the sleeve between said nuts and adapted to engage the beveled face of said members to prevent the removal of the inner member from the outer one when the members are coupled.

5. A hose coupler comprising an outer member having an enlarged bulb-like body formed with an opening having an inwardly beveled face, an inner member having a cylindrical body formed at one end with a head having a beveled face to oppose the beveled face of the other member, a sleeve slidable upon the inner member, clamping nuts upon said sleeve, a washer ring held on the sleeve between said nuts and adapted to engage the beveled faces of said members to prevent the removal of the inner member from the outer one when the members are coupled and a stop sleeve screwed upon the outer end of the inner member.

6. A hose coupler comprising an outer member provided with a contracted opening, an inner member provided with a head, a stop upon the inner member, a sleeve upon the inner member between said head and said stop and a washer carried by the slidable member and adapted to be wedged between said head of the inner member and the contracted opening of the outer member.

In testimony whereof I hereunto affix my signature in the presence of two witnesses.

JESS F. HINCK.

Witnesses:
J. C. HAZLETT,
C. L. CAMPBELL.